United States Patent
Zhu

(10) Patent No.: US 11,926,193 B2
(45) Date of Patent: Mar. 12, 2024

(54) RECREATIONAL VEHICLE VENT TOP COVER STILL CAPABLE OF VENTILATION IN CLOSED STATE OF TOP COVER

(71) Applicant: HANGZHOU KAIRUIFAN IMPORT & EXPORT TRADING CO. LTD., Zhejiang (CN)

(72) Inventor: Wenyao Zhu, Hangzhou (CN)

(73) Assignee: HANGZHOU KAIRUIFAN IMPORT & EXPORT TRADING CO. LTD. (CN)

( * ) Notice: Subject to any disclaimer, the term of this patent is extended or adjusted under 35 U.S.C. 154(b) by 174 days.

(21) Appl. No.: 17/548,256

(22) Filed: Dec. 10, 2021

(65) Prior Publication Data
US 2023/0182538 A1    Jun. 15, 2023

(51) Int. Cl.
*B60H 1/26*    (2006.01)
*B60H 1/24*    (2006.01)

(52) U.S. Cl.
CPC .............. *B60H 1/262* (2013.01); *B60H 1/245* (2013.01)

(58) Field of Classification Search
CPC . B60H 1/24; B60H 1/241; B60H 1/26; B60H 1/262; B60H 1/245
See application file for complete search history.

(56) References Cited

U.S. PATENT DOCUMENTS

| 4,448,112 A | * | 5/1984 | Soderberg | ................. B63J 2/02 |
| | | | | 114/211 |
| 4,615,263 A | * | 10/1986 | Titterud | ................. B60J 7/1642 |
| | | | | 454/94 |
| 6,106,385 A | * | 8/2000 | Humphrey | ............... B60H 1/26 |
| | | | | 454/94 |

FOREIGN PATENT DOCUMENTS

KR        960007529 Y1 *  8/1996

OTHER PUBLICATIONS

Translation, KR-960007529-Y1, Aug. 1996 (Year: 1996).*

* cited by examiner

*Primary Examiner* — Jessica Yuen
(74) *Attorney, Agent, or Firm* — BOTKIN & HALL, LLP

(57) ABSTRACT

A vehicle vent top cover still capable of ventilation in a closed state of the top cover, which includes a top cover body, which includes a top plate; a fixed rim and side protection plates are arranged below the top plate; the fixed rim is located at the inner side of the side protection plate; the fixed rim is provided with a first ventilation groove; an air duct structural frame is fixed below the top plate; the air duct structural frame is located above the bottom walls of the side protection plates; the first ventilation groove and an upper surface of the air duct structural frame form an air inlet; one side of the air duct structural frame close to the side protection plate is provided with a second ventilation groove; and the second ventilation groove and the side wall of the side protection plate form an air outlet.

10 Claims, 7 Drawing Sheets

RECREATIONAL VEHICLE VENT TOP COVER STILL CAPABLE OF VENTILATION IN CLOSED STATE OF TOP COVER

TECHNICAL FIELD

The present invention relates to the technical field of ventilation of recreational vehicles, and particularly relates to a vehicle vent top cover still capable of ventilation in a closed state of the top cover.

BACKGROUND ART

Recreational vehicles are a kind of mobile vehicles with basic facilities necessary for home. The recreational vehicle is a fashionable product that integrates "clothing, food, housing and transportation" and realizes "traveling in life and living in travel". The recreational vehicle is generally equipped with a vent at a roof and can open the vent for ventilation. Some ventilation windows are also equipped with a ventilator for assisting the ventilation. The vent may be provided with a top cover for opening and closing the vent. However, the ordinary top cover cannot be opened in rainy days, which is easy to cause the rain permeation into the vehicle through the vent, so that the recreational vehicle is inconvenient for ventilation in rainy days. Although an external rainproof apparatus may be installed, the transparency may be affected, and additional cost may be added.

SUMMARY OF THE INVENTION

A purpose of the present invention is to provide a vehicle vent top cover still capable of ventilation in a closed state of the top cover, which solves the problem that vehicles cannot realize the ventilation in rainy days.

According to a purpose of the present invention, the present invention provides a vehicle vent top cover still capable of ventilation in a closed state of the top cover, which includes a top cover body and an air duct structural frame, wherein the top cover body includes a top plate; fixed rims and side protection plates are arranged below the top plate; the fixed rims are located at the inner sides of the side protection plates; and the fixed rims are provided with a first ventilation groove respectively; and the air duct structural frame is fixed below the top plate; the air duct structural frame is located above the bottom walls of the side protection plates; the first ventilation groove and an upper surface of the air duct structural frame form an air inlet; one side of the air duct structural frame close to the side protection plate is provided with a second ventilation groove; and the second ventilation groove and the side wall of the side protection plate form an air outlet.

Further, a screw-fixing bore log is arranged below the top plate, the air duct structural frame is provided with a screw hole, and the air duct structural frame is fixed by screws and the screw-fixing bore logs on the top plate.

Further, the air duct structural frame includes a panel with a hollow window, the panel is located above the bottom walls of the side protection plates, a circle of connecting rim is integrally formed on the panel along the outer edge of the hollow window, the connecting rim is perpendicular to the panel, the fixed rim corresponds to the connecting rim, the second ventilation groove is arranged at the edge of the panel, and the second ventilation grooves and the first ventilation grooves are staggered to each other.

Further, at least one side wall of the panel is provided with the second ventilation groove.

Further, two opposite side walls of the panel are provided with the second ventilation groove respectively.

Further, three side walls of the panel are provided with the second ventilation groove respectively.

Further, four side walls of the panel are provided with the second ventilation groove respectively.

Further, the upper surface of the top plate is a plane structure or an arc structure.

Further, the side protection plate is perpendicular to the top plate.

Further, the inner side of the top plate is provided with a sliding strip connected with a metal push rod with a gear, and the sliding strip is fixed on a fixed buckle at the inner side of the top plate.

According to the technical solution of the present invention, when the top cover body is closed, the air duct structural frame and rubber strips on a ventilator squeeze each other to achieve a sealing and rainproof effect; an opening of the air outlet faces downward and is located inside the side protection plates, so that rain and snow cannot enter the vehicle; and in case of extreme weather, rainwater enters an air duct through the air outlet, the rainwater may also be blocked by the other side of the air duct structural frame, so that the ventilation of the vehicle in rainy days and snowy days can be realized, and the ventilator can be opened for ventilation when there is no rain.

BRIEF DESCRIPTION OF THE DRAWINGS

To more clearly describe the technical solutions in the specific embodiments of the present invention or in prior art, the drawings required to be used in the description of the specific embodiments or the prior art will be simply presented below. Apparently, the drawings in the following description are merely some embodiments of the present invention, and for those ordinary skilled in the art, other drawings can also be obtained according to these drawings without contributing creative labor.

Figure 1:
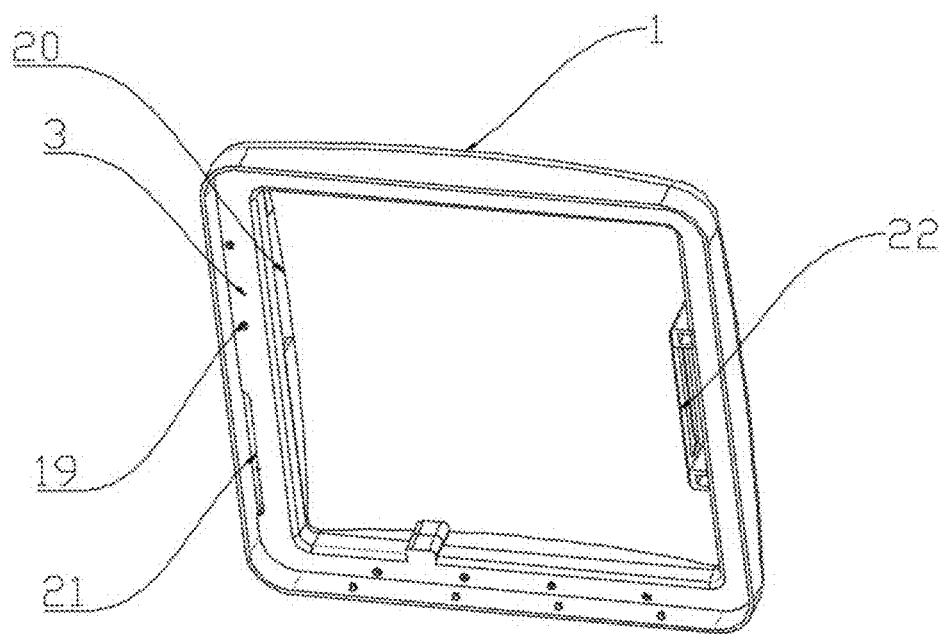
FIG. 1 is a structure schematic diagram of a top cover body and an air duct structural frame according to an embodiment of the present invention.
Figure 2:
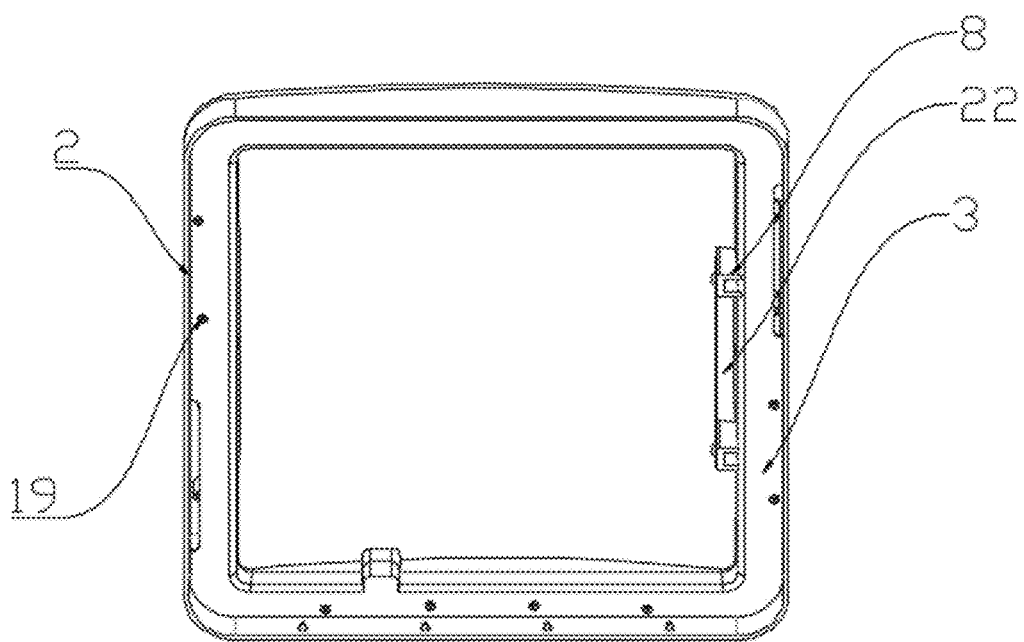
FIG. 2 is another structure schematic diagram of the top cover body and the air duct structural frame according to an embodiment of the present invention.
Figure 3:
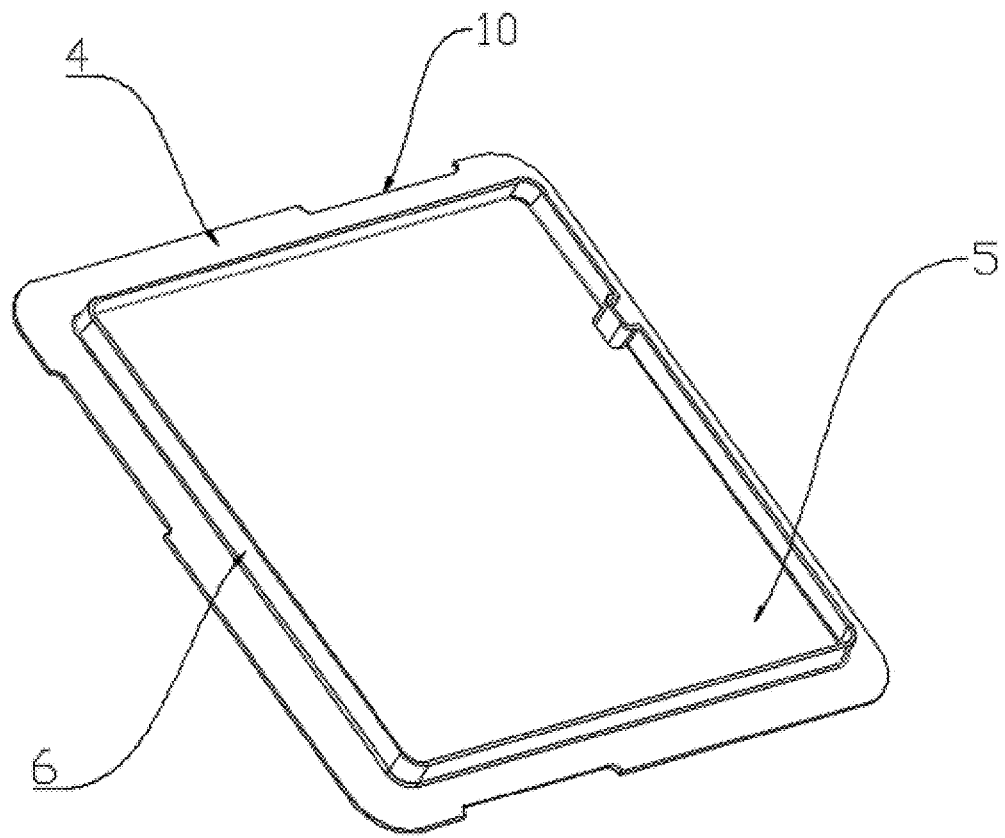
FIG. 3 is a structure schematic diagram of the air duct structural frame according to an embodiment of the present invention.
Figure 4:
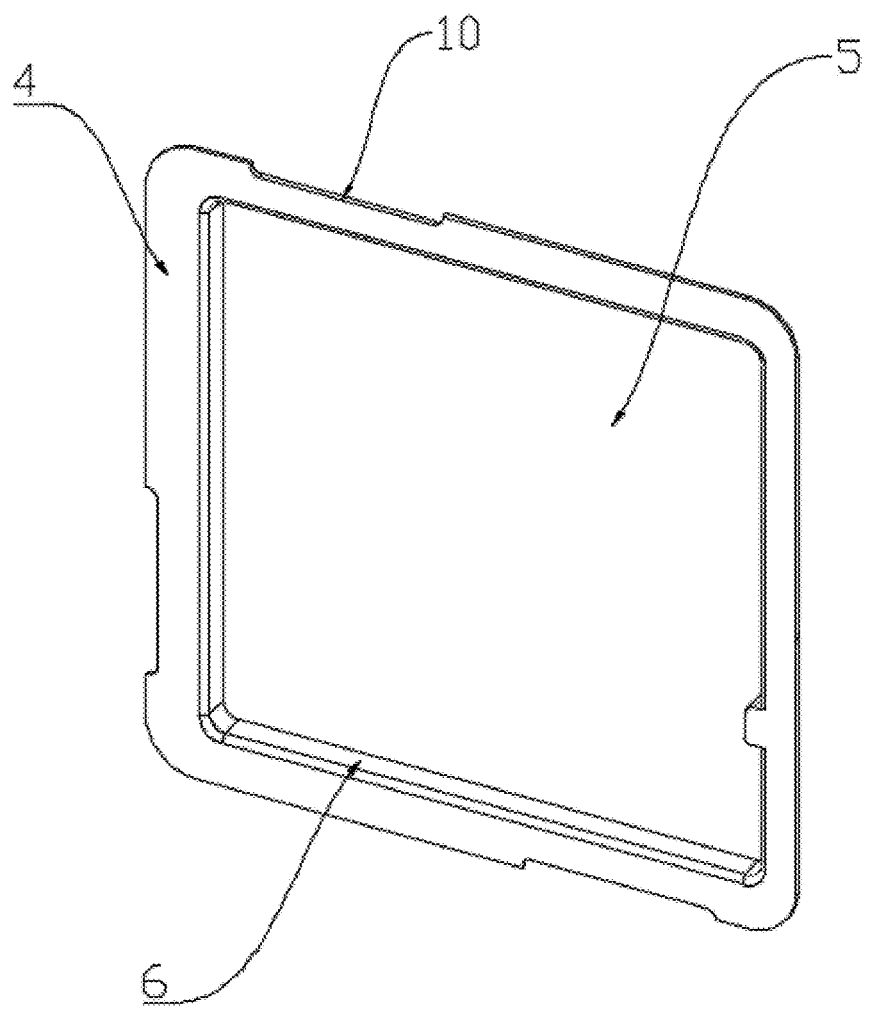
FIG. 4 is another structure schematic diagram of the air duct structural frame according to an embodiment of the present invention.
Figure 5:
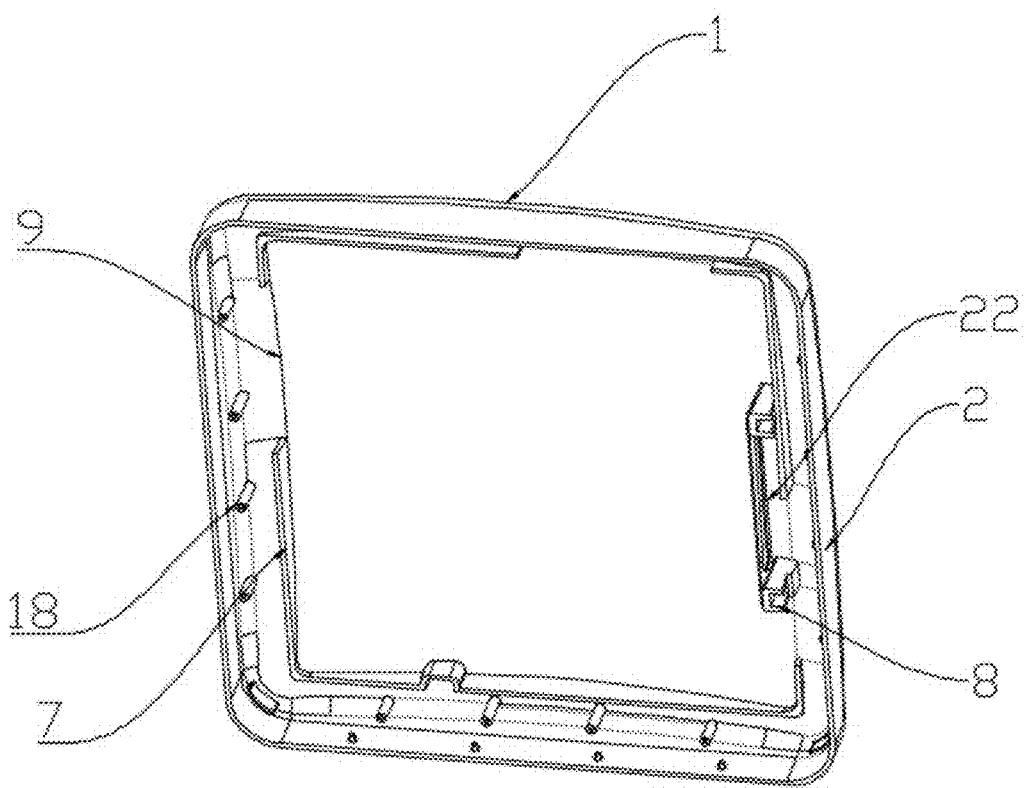
FIG. 5 is a structure schematic diagram of a top plate according to an embodiment of the present invention.

Reference numerals: 1—top plate; 2—side protection plate; 3—air duct structural frame; 4—panel; 5—hollow window; 6—connecting rim; 7—fixed rim; 8—fixed buckle; 9—first ventilation groove; 10—second ventilation groove; 11—ventilator body; 12—top cover; 13—frame body; 14—hinge; 15—fan; 16—rim; 17—sealing rubber strip;

18—fixing bore log; 19—screw hole; 20—air inlet; 21—air outlet; 22—metal sliding strip; and 23—metal push rod with a gear.

DETAILED DESCRIPTION OF THE INVENTION

The technical solutions of the present invention will be clearly and fully described below in combination with the embodiments. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

In the description of the present invention, it should be noted that the terms "center", "longitudinal", "horizontal", "length", "width", "thickness", "upper," "lower," "front," "rear," "left," "right", "vertical", "horizontal", "top", "bottom", "inside", "outside", "clockwise", "counterclockwise" and the like indicating the orientation or positional relationship are based on the orientation or positional relationship shown in the drawings, and are only used for convenience in describing the present invention and simplifying the description, rather than indicating or implying that specific devices or elements must have a specific orientation and be constructed and operated in a specific orientation. Therefore, the terms cannot be understood as limitations to the present invention.

In addition, terms "first" and "second" are only for the purpose of description, and cannot be understood as indicating or implying relative importance or implicitly indicating the number of indicated technical features. Therefore, features defined with "first" and "second" may explicitly or implicitly include one or more of the features. In the description of the present invention, "a plurality of" means two or more, unless otherwise specified. Furthermore, the terms "installed", "connected" and "connection" should be understood in a broad sense, for example, it can be a fixed connection, a detachable connection, or an integral connection; it can be a mechanical connection or an electrical connection; and it can be a direct connection or an indirect connection through an intermediate medium, and can be internal communication of two elements. For those ordinary skilled in the art, the specific meaning of the above terms in the present invention may be understood in specific circumstances.

Embodiment 1

As shown in FIG. 1, FIG. 2, FIG. 3, FIG. 4 and FIG. 5,

A vehicle vent top cover still capable of ventilation in a closed state of the top cover includes a top cover body; the top cover body includes a top plate 1 and side protection plates 2 that are integrally formed on the periphery of the top plate 1, and an upper surface of the top plate 1 is an arc structure. The side protection plates 2 and the top plate 1 are perpendicular to each other or arranged to form a certain inclination angle; and an inner surface of the top plate 1 is provided with an air duct structural frame 3, and the air duct structural frame 3 is arranged on the inner surface of the top plate 1.

Specifically, the air duct structural frame 3 includes a panel 4 with a hollow window 5, the panel 4 is located above the bottom walls of the side protection plates 2 (the bottom edge of the panel 4 is higher than the bottom edges of the side protection plates 2), and the side wall of the panel 4 is attached to the inner sides of the side protection plates 2. A circle of connecting rim 6 is integrally formed on the panel 4 along the outer edge of the hollow window 5, and the connecting rim 6 is perpendicular to the panel 4; and screw-fixing bore logs 18 are arranged below the top plate 1, the panel 4 is provided with screw holes 19, and the panel 4 is fixed by screws and the screw-fixing bore logs 18 on the top plate 1, thereby realizing the connection between the air duct structural frame 3 and the top plate 1.

Fixed rims 7 are integrally formed on the inner wall of the top plate 1, the fixed rims 7 are located at the inner sides of the side protection plates 2, and the fixed rims 7 correspond to the connecting rims 6. The inner side of the top plate 1 is provided with a metal sliding strip 22 connected with a metal push rod with a gear, and the metal sliding strip 22 is fixed on a fixed buckle 8 at the inner side of the top plate 1.

The fixed rim 7 is provided with a first ventilation groove 9, and the first ventilation groove 9 and the upper surface of the connecting rim 6 form an air inlet 20. The side wall of the panel 4 is provided with a second ventilation groove 10, and the second ventilation groove 10 and the side wall of the side protection plate 2 form an air outlet 21. The second ventilation grooves 10 and the first ventilation grooves 9 are staggered to each other, and the second ventilation groove 10 and the first ventilation groove 9 located at the same side form a ventilation passage by combining the air duct structural frame 3 and the top plate 1, so that gas in the vehicle can be discharged from the air outlet 21 via the air inlet 20 under the action of the ventilator.

The number of the second ventilation grooves 10 of the present apparatus is not limited to one and may also be two or more. When the number of the second ventilation grooves 10 is two, the two second ventilation grooves 10 can be arranged on two opposite side walls of the air duct structural frame 3. The number of the second ventilation grooves 10 may also be three or four; when the number of the second ventilation grooves 10 is four, four side walls of the air duct structural frame 3 are respectively provided with the two second ventilation grooves 10. It should be understood that the number of the second ventilation grooves 10 arranged on the side walls of the air duct structural frame 3 where the second ventilation grooves 10 are arranged is not necessarily limited to one, but can be two or more.

Embodiment 2

Figure 6:
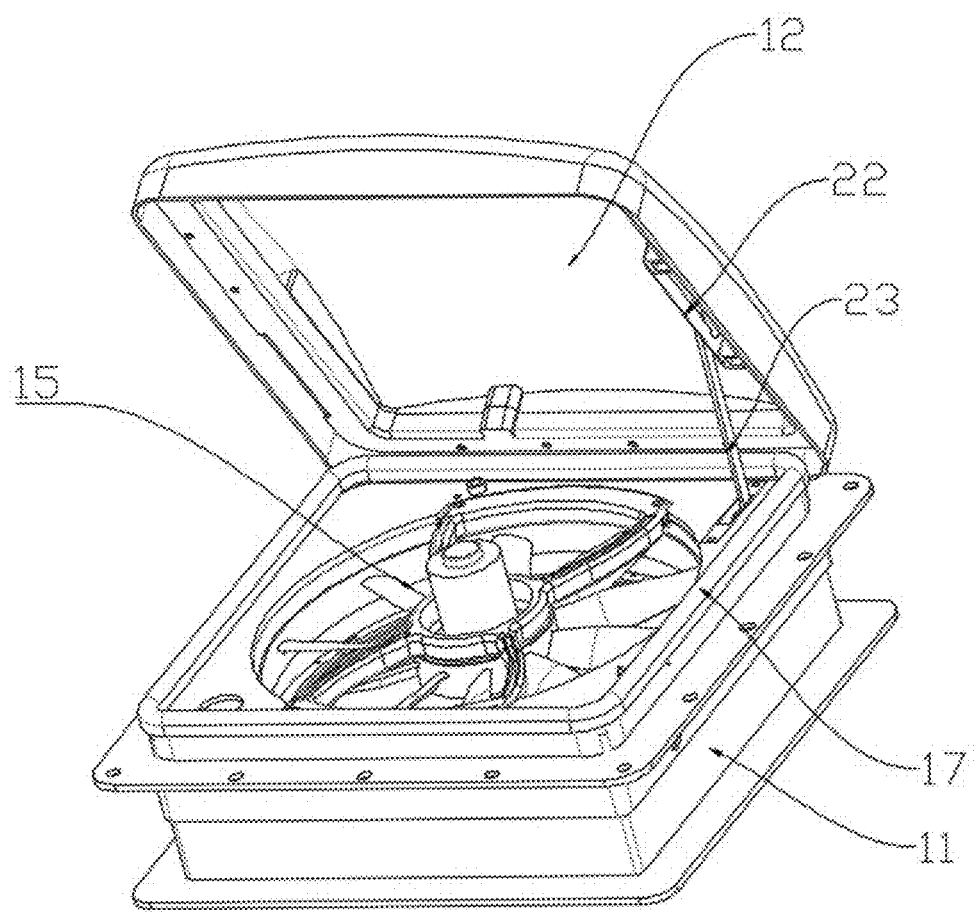
FIG. 6 is a schematic diagram of a combined structure of a top cover and a ventilator according to an embodiment of the present invention.
Figure 7:
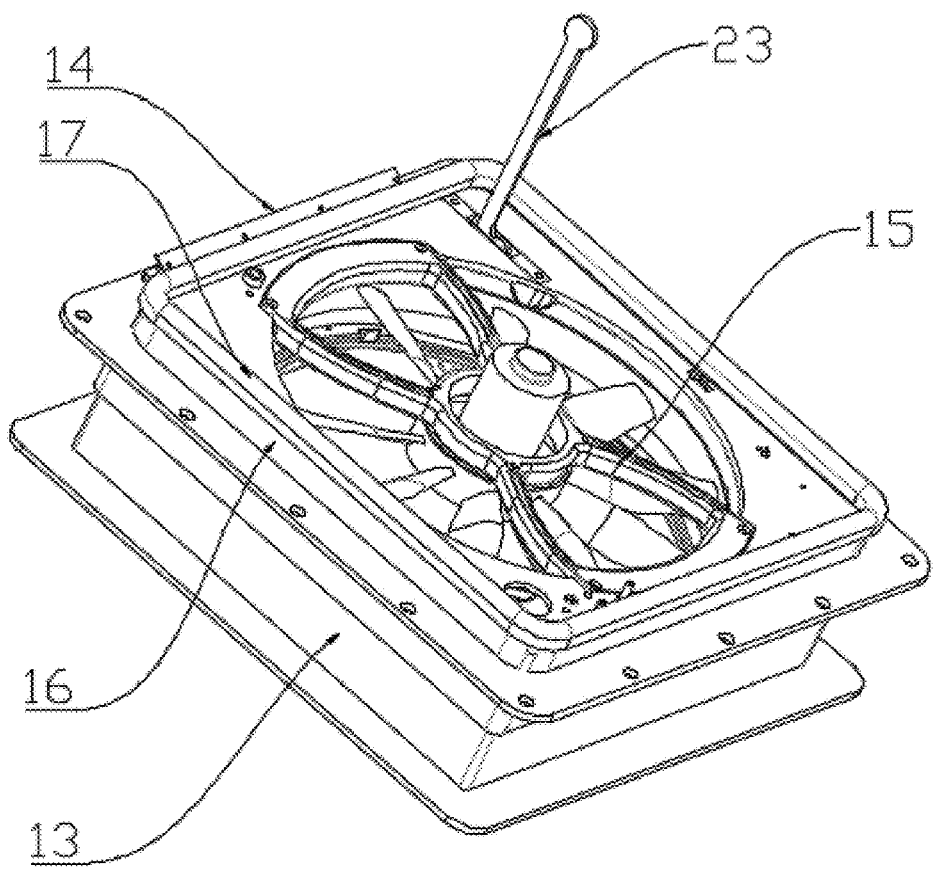
FIG. 7 is a structure schematic diagram of the ventilator according to an embodiment of the present invention.

As shown in FIG. 6 and FIG. 7, the present embodiment provides a combination of a top cover and a ventilator. A vehicle vent for rainy days includes the vehicle vent top cover still capable of ventilation in the closed state of the top cover, and specifically includes a ventilator body 11 and the top cover 12, and the top cover 12 is hinged with the ventilator body 11 through a hinge 14. One end of a metal push rod 23 with a gear is slidably connected with a metal sliding strip 22, and the other end of the metal push rod 23 with the gear is fixed on a fan main body frame. The ventilator body 11 includes a frame body 13, and a fan 15 is installed in the frame body 13. The frame body 13 is provided with a circle of rim 16 surrounding the fan 15. The air duct structural frame 3 corresponds to the rim 16, the rim 16 is provided with a sealing rubber strip 17, the air duct structural frame 3 rotates downward until the top cover is fully closed through a gear member, the air duct structural frame 3 compresses the sealing rubber strip 17 tightly on the rim 16, and the compression between the air duct structural frame 3 and the sealing rubber strip 17 realizes the sealing between the two, thereby realizing a rainproof and snow protection effect.

According to the present invention, the top cover and the ventilation fan form a complete ventilation system, and the air duct structural frame arranged in the top cover presses the sealing rubber strip of the ventilation fan, thereby achieving an effect for preventing rainwater or dust from entering the vehicle when the top cover is closed. The second ventilation groove 10 is arranged on the air duct structural frame and the first ventilation groove 9 is arranged on the top plate 1, so that when the ventilation fan is started, air passes through the air inlet 20 and the air outlet 21 in sequence. When the top cover is closed, an opening of the air outlet 21 formed by the second ventilation groove 10 faces downward, so that the rainwater cannot enter the vehicle; and moreover, the bottom edge of the air duct structural frame is provided with the side protection plates of the top cover for blocking, thereby preventing the rainwater from entering the vehicle.

The top cover of the present invention can also play a role of partial air convection when installed on an unpowered fan or a skylight, thereby improving the air quality in the vehicle. By arranging the top cover and the air duct structural frame, an effect for preventing the rainwater from entering the vehicle can be well ensured; the second ventilation grooves 10 arranged on the air duct structural frame and the first ventilation grooves 9 arranged on the top plate 1 form the air outlet 21 and the air inlet 20 respectively, so that the ventilation of the vehicle in rainy days can be realized; the air outlet 21 and the air inlet 20 are staggered to each other and the bottom edge of the panel 4 is higher than the bottom edges of the side protection plates 2, so that the rainwater can be prevented from entering the vehicle; and the air quality in the vehicle can be ensured, the top cover can be opened for light transmission and ventilation when there is no rain, so that the problem that the ventilation in the vehicle cannot be realized in the rainy days can be solved, and the air quality and comfort in the vehicle can be improved.

By using the vehicle vent top cover still capable of ventilation in the closed state of the top cover provided by the present invention, when in rainy days, the top cover body is closed; when the ventilator rotates and exhausts air outwards, part of air may enter the air duct structural frame through the air inlet 20 and is then discharged from the air outlet 21, thereby forming a ventilation process. When the top cover is closed, the air duct structural frame and the rubber strips installed on the ventilator squeeze each other to achieve the sealing and rainproof effect, and the air outlet 21 and the air inlet 20 are located at two sides of the air duct structural frame respectively, so that the sealing effect may not be affected, thereby achieving an effect for preventing the rainwater from entering the vehicle. The opening of the air outlet 21 that is used for exhaustion faces downward and is located inside the side protection plates, so that rain and snow cannot enter the vehicle. The ventilation purpose of the vehicle in rainy days and snowy days can be realized.

The present invention provides the vehicle vent top cover capable of ventilation in the closed state, which can be used especially when the top cover cannot be opened for ventilation in rainy days. The vehicle vent top cover includes the top cover body and the air duct structural frame; and the top cover body includes the top plate, a connecting fixed rim and side protection plates below the top plate, and screw-fixing bore logs. The connecting fixed rim is provided with the groove which forms an air inlet when the fixed rim is fixed with the air duct structural frame. The air duct structural frame is located above the bottom walls of the side protection plates and provided with the screw holes and is fixed by screws and the bore logs on the top cover body. The other side of the air duct structural frame is provided with the groove which forms an air outlet with the side protection plate of the top cover when the air duct structural frame is fixed. According to the present invention, when the top cover body is closed, the air duct structural frame and rubber strips on a ventilator squeeze each other to achieve a sealing and rainproof effect. The opening of the air outlet faces downward and is located inside the side protection plates, so that rain and snow cannot enter the vehicle; and in case of extreme weather, rainwater enters an air duct through the air outlet, the rainwater may be blocked by the other side of the air duct structural frame, and the air outlet and the air inlet are staggered to each other. Therefore, the ventilation of the vehicle in rainy days and snowy days can be realized, and the top cover can be opened for ventilation when there is no rain.

Finally, it should be noted that the above embodiments are only used for illustrating the technical solutions of the present invention rather than limiting the present invention. Although the present invention is described in detail with reference to the foregoing embodiments, it should be understood by those skilled in the art that the technical solutions described in the foregoing embodiments may be modified or some technical features may be equivalently substituted. However, these modifications or substitutions do not make the essence of the corresponding technical solutions depart from the scope of the technical solutions of various embodiments of the present invention.

The invention claimed is:

1. A vehicle vent top cover still capable of ventilation in a closed state of the top cover, characterized by comprising a top cover body and an air duct structural frame, wherein the top cover body comprises a top plate; fixed rims and side protection plates are arranged below the top plate; the fixed rims are located at inner sides of the side protection plates; and the fixed rims are provided with a first ventilation groove respectively; and the air duct structural frame is fixed below the top plate; the air duct structural frame is located above the bottom walls of the side protection plates; the first ventilation groove and an upper surface of the air duct structural frame form an air inlet; one side of the air duct structural frame close to the side protection plate is provided with a second ventilation groove; and the second ventilation groove and the side wall of the side protection plate form an air outlet.

2. The vehicle vent top cover still capable of ventilation in the closed state of the top cover according to claim 1, characterized in that a screw-fixing bore log is arranged below the top plate, the air duct structural frame is provided with a screw hole, and the air duct structural frame is fixed by screws and the screw-fixing bore logs on the top plate.

3. The vehicle vent top cover still capable of ventilation in the closed state of the top cover according to claim 1, characterized in that the air duct structural frame comprises a panel with a hollow window, the panel is located above the bottom walls of the side protection plates, a circle of connecting rim is integrally formed on the panel along the outer edge of the hollow window, the connecting rim is perpendicular to the panel, the fixed rim corresponds to the connecting rim, the second ventilation groove is arranged at the edge of the panel, and the second ventilation grooves and the first ventilation grooves are staggered to each other.

4. The vehicle vent top cover still capable of ventilation m the closed state of the top cover according to claim 1, characterized in that at least one side wall of a panel is provided with the second ventilation groove.

5. The vehicle vent top cover still capable of ventilation in the closed state of the top cover according to claim 1, characterized in that two opposite side walls of a panel are provided with the second ventilation groove respectively.

6. The vehicle vent top cover still capable of ventilation in the closed state of the top cover according to claim 1, characterized in that three side walls of a panel are provided with the second ventilation groove respectively.

7. The vehicle vent top cover still capable of ventilation in the closed state of the top cover according to claim 1, characterized in that four side walls of a panel are provided with the second ventilation groove respectively.

8. The vehicle vent top cover still capable of ventilation in the closed state of the top cover according to claim 1, characterized in that an upper surface of the top plate is a plane structure or an arc structure.

9. The vehicle vent top cover still capable of ventilation in the closed state of the top cover according to claim 1, characterized in that the side protection plate is perpendicular to the top plate.

10. The vehicle vent top cover still capable of ventilation in the closed state of the top cover according to claim 1, characterized in that an inner side of the top plate is provided with a sliding strip connected with a metal push rod with a gear, and the sliding strip is fixed on a fixed buckle at the inner side of the top plate.

* * * * *